July 24, 1934.  C. SPAETH  1,967,910
RECTIFIER
Filed March 4, 1927
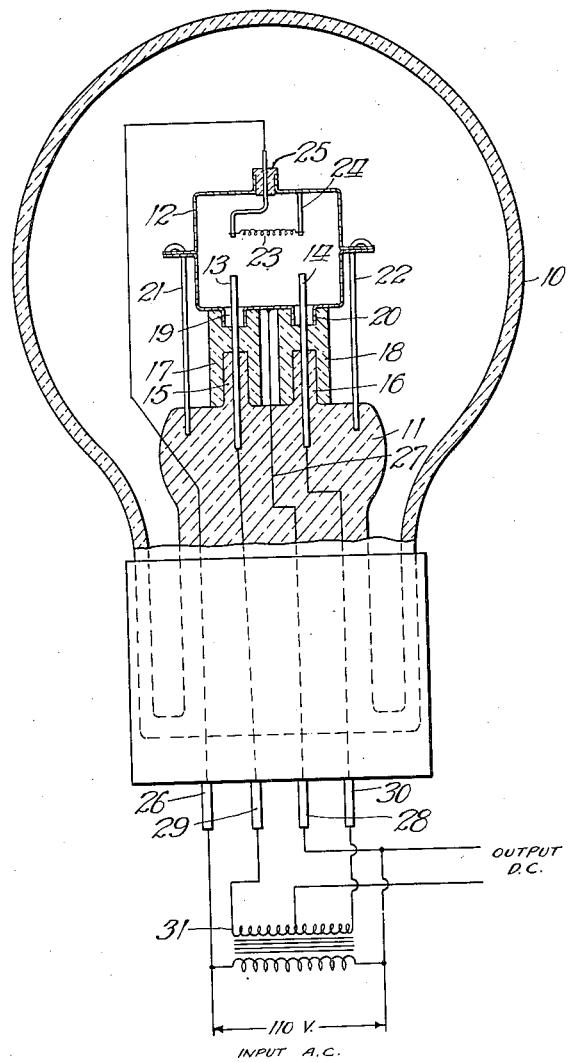
Inventor
Charles Spaeth Patented July 24, 1934

1,967,910

UNITED STATES PATENT OFFICE 1,967,910

RECTIFIER

Charles Spaeth, Chicago, Ill., assignor, by mesne assignments, to Old Colony Trust Company, a corporation of Massachusetts, trustee Application March 4, 1927, Serial No. 172,701

3 Claims. (Cl. 250—27.5)

My invention relates to rectifying devices operating on the principle of point to plate rectification for converting alternating current into unidirectional or direct current, and has for its object the provision of a new rectifier of this character in which the amount of current rectified by a single rectifier is much greater than the amount which would be obtained with the use of a point electrode and plate electrode alone.

My invention is capable of being designed and arranged in many forms. One of the forms which I have found very practical and desirable consists in the utilization of a point to plate rectifier in the presence of a heated element within a gas filled envelope. In this form the heated element may consist of an incandescent filament.

In this specific form of my invention, I prefer to use an envelope having a filling consisting of one of the noble gases such as helium. In filling the envelope or bulb, I first evacuate the same so that it is in an extremely high state of rarefaction, preferably in the neighborhood of .01 microns of mercury pressure whereafter I fill the said bulb with one of the noble gases up to a pressure of between 5 and 20 mm. of mercury pressure. I find that a bulb filled in this manner is most satisfactory in operation.

In the drawing:

Fig. 1 is a sectional view of the rectifier embodying my improvements.

Referring now in detail to the drawing, I provide the usual evacuated glass vessel 10 which is evacuated in the manner hereinbefore described and then refilled with one of the noble gases, such as helium, to the desired pressure which is preferably a pressure of between 5 and 20 mm. of mercury. This tube is provided with the inwardly extending stem or press 11 which supports a cup-like electrode 12 which functions as a cathode, and the two point electrodes 13 and 14 which function as anodes within the electrode 12 to form a point to plate rectifier. In order to properly support the electrode 12, I form the electrodes 13 and 14 of metallic rods, preferably of nickel having their lower ends secured in the press 11 which is provided with a pair of tubes 15 and 16 projecting upwardly around the nickel rods to support the bushings 17 and 18 which in turn support the cup-like electrode 12. These bushings may be of any suitable insulating material. They are provided at the upper ends with sleeve-like portions into which the downstruck portions 19 and 20 of the lower half of the cup-shaped electrode extend. This provides a firm and well insulated support for both the point and plate electrodes and insures the proper spacing between them  To further insure stability of the structure and to facilitate manufacturing, I make the cup electrode of two half-portions and secure the two portions together by means of the supporting rods 21 and 22 which extend through the flanges of the two half-portions and are mounted at their lower ends in the press 11. The structure above recited, when the proper connections are made to the input and output electrical circuits provides a full wave rectifier for converting alternating current into direct current.

My invention contemplates the provision of means cooperating with the above mentioned structure to increase the capacity of the rectifier for converting purposes. To carry out the purpose of my invention, I provide a heated element, shown in this instance as a filament 23 adjacent the point to plate rectifier just described. As shown, I mount this filament within the cup electrode and provide connections whereby it may be supplied with a suitable current for heating the same. I have found by experiment that the introduction of this heated element in the presence of the point to plate rectifier increases greatly the flow of current during rectification, the increase in some instances amounting to as much as 25% over the amount of current flowing without the introduction of the heated element. The filament 23 has one end connected to the cup electrode 12 at 24 and has a connection for the other end passing through the cup and insulated therefrom by means of a suitable bushing 25 to a terminal 26. The cup electrode has a connection 27 to the terminal 28 which is in turn connected to one side of the output circuit as illustrated and also connected to the other side of the input circuit for the filament. This provides means for supplying heating current to the filament with the addition of but one terminal on the rectifier tube. The electrodes 13 and 14 are provided with suitable terminals 29 and 30 which are connected in the operation of the device to the opposite ends of a transformer 31 whereby a relatively high voltage may be impressed upon them. This transformer, of course, may derive its current as shown from the same source as the filament.

While my invention is not limited to the particular structure shown and described, I have found this structure very efficient in operation. This structure enables the use of a minimum number of terminals and in addition by enclosing the filament within the cup electrode prevents light radiation therefrom and thus prevents overheating of the glass tube. This is very desirable since with an open cup and exposed filament, the glass vessel is inclined to become so hot as to make it dangerous to handle.

While I have shown one form which my invention may take, I wish it to be distinctly understood that I do not intend to limit myself to the exact details shown and described, but that I intend to avail myself of all such modifications as would occur to one skilled in this art and as fall within the scope of the claims.

Having thus described my invention, what I claim as new and desire to secure by U. S. Letters Patent is:

1. A gaseous discharge device comprising a gas tight envelope containing a gas filling of sufficient pressure to maintain a gaseous glow discharge between spaced electrodes, a hollow glow cathode having in its interior a solid active electrode surface of large area, a point-like anode having an active electrode surface of very small area, and mounted to confine the discharge therefrom to the interior of said cathode, the electrode area of said cathode being sufficiently large to permit passage of a substantial glow discharge current in the direction from the anode to the cathode, and the electrode surface of said anode having sufficiently small area to substantially prevent flow of current in opposite direction between said electrodes and act as a unilaterally conducting valve, and a heater element inside said hollow cathode to be heated to incandescence to support the discharge.

2. A gaseous discharge device comprising a gas tight envelope containing a gas filling of sufficient pressure to maintain a gaseous glow discharge between spaced electrodes, a hollow glow cathode having in its interior a solid active electrode surface of large area, a plurality of point-like anodes having active electrode surfaces of very small area, and mounted to confine the discharge therefrom to the interior of said cathode, the electrode area of said cathode being sufficiently large to permit passage of a substantial glow discharge current in the direction from the anodes to the cathode, and the electrode surface of said anode having sufficiently small area to substantially prevent flow of current in opposite direction and act as a unilaterally conducting valve, and a heater element inside said hollow cathode to be heated to incandescence to support the discharge.

3. A gaseous discharge device comprising a gas tight envelope containing a gas filling of sufficient pressure to maintain a gaseous glow discharge between spaced electrodes, a hollow cathode structure having in its interior a solid active electrode surface of large area, a point-like anode having an active electrode surface of very small area, and mounted to confine the discharge therefrom to the interior of said cathode, the electrode area of said cathode structure being sufficiently large to permit passage of a substantial glow discharge current in the direction from the anode to the cathode electrode surface, and the electrode surface of said anode having sufficiently small area to substantially prevent flow of current in opposite direction between said electrodes and act as a unilaterally conducting valve, and a heater element inside said hollow cathode to be heated to incandescence to support the discharge, said cathode structure having in its outer wall a hollow tubular extension surrounding the inner end portion of said anode for limiting the effective electrode surface thereof.

CHARLES SPAETH.